(12) United States Patent
Thomas et al.

(10) Patent No.: US 7,618,610 B2
(45) Date of Patent: *Nov. 17, 2009

(54) NIOBIUM SUBOXIDE POWDER

(75) Inventors: Oliver Thomas, Bad Harzburg (DE); Christoph Schnitter, Holle (DE)

(73) Assignee: H. C. Starck GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,536

(22) Filed: Jun. 2, 2008

(65) Prior Publication Data

US 2008/0291605 A1 Nov. 27, 2008

Related U.S. Application Data

(63) Continuation of application No. 10/889,719, filed on Jul. 13, 2004, now Pat. No. 7,381,396.

(30) Foreign Application Priority Data

Jul. 15, 2003 (DE) .................. 103 31 891

(51) Int. Cl.
*C01G 33/00* (2006.01)
*H01G 9/00* (2006.01)
*H01G 9/04* (2006.01)
*H01G 9/042* (2006.01)

(52) U.S. Cl. .................. 423/594.8; 423/594.17; 361/528; 361/529

(58) Field of Classification Search .............. 423/594.8, 423/594.17; 361/528, 529
See application file for complete search history.

(56) References Cited

U.S. PATENT DOCUMENTS

| 6,171,363 | B1 | 1/2001 | Shekhter et al. |
| 6,462,934 | B2 | 10/2002 | Kimmel et al. |
| 6,558,447 | B1 | 5/2003 | Shekhter et al. |
| 6,652,619 | B2 | 11/2003 | Omori et al. |
| 6,759,026 | B2 | 7/2004 | Kimmel et al. |
| 6,762,927 | B2 | 7/2004 | Schnitter et al. |
| 6,896,715 | B2 | 5/2005 | Fife |
| 6,934,146 | B2 | 8/2005 | Omori et al. |
| 7,157,073 | B2 * | 1/2007 | Motchenbacher et al. .............. 423/594.17 |
| 7,381,396 | B2 * | 6/2008 | Thomas et al. ........... 423/594.8 |
| 2003/0104923 | A1 | 6/2003 | Omori et al. |
| 2003/0170169 | A1 | 9/2003 | Omori et al. |
| 2003/0218857 | A1 | 11/2003 | Omori et al. |

FOREIGN PATENT DOCUMENTS

| EP | 1 388 870 A1 | 2/2004 |
| WO | WO-00/67936 A1 | 11/2000 |

\* cited by examiner

*Primary Examiner*—Timothy C Vanoy
(74) *Attorney, Agent, or Firm*—Connolly Bove Lodge & Hutz LLP

(57) ABSTRACT

A niobium suboxide powder comprising 100 to 600 ppm of magnesium is described. The niobium suboxide powder may (alternatively or in addition to 100 to 600 ppm of magnesium) further include 50 to 400 ppm of molybdenum and/or tungsten. The niobium suboxide powder is suitable for the production of: capacitors having an insulator layer of niobium pentoxide; capacitor anodes produced from the niobium suboxide powder; and corresponding capacitors.

9 Claims, 2 Drawing Sheets

NIOBIUM SUBOXIDE POWDER

CROSS REFERENCE TO RELATED PATENT APPLICATION

This application is a continuation of U.S. patent application Ser. No. 10/899,719, filed Jul. 13, 2004 and issued as U.S. Pat. No. 7,381,396, which claims the right of priority under 35 U.S.C. § 119 (a)-(d) of German Patent Application No. DE 103 31 891.7, filed Jul. 15, 2003.

FIELD OF THE INVENTION

The invention relates to a niobium suboxide powder which is suitable for the production of capacitors with a niobium pentoxide insulator layer, to capacitor anodes produced from the niobium suboxide powder, and to corresponding capacitors.

Solid electrolyte capacitors with a very large active capacitor surface area and therefore a small overall construction suitable for mobile communications electronics used are predominantly capacitors with a niobium or tantalum pentoxide barrier layer applied to a corresponding conductive substrate, utilizing the stability of these compounds ("valve metals"), the relatively high dielectric constant and the fact that the insulating pentoxide layer can be produced with a very uniform layer thickness by electrochemical means. The substrates used are metallic or conductive lower oxide (suboxide) precursors of the corresponding pentoxides. The substrate, which simultaneously forms a capacitor electrode (anode) comprises a highly porous, sponge-like structure which is produced by sintering extremely fine-particle primary structures or secondary structures which are already in sponge-like form. The surface of the substrate structure is electrolytically oxidized ("formed") to produce the pentoxide, with the thickness of the pentoxide layer being determined by the maximum voltage of the electrolytic oxidation ("forming voltage"). The counterelectrode is produced by impregnating the sponge-like structure with manganese nitrate, which is thermally converted into manganese dioxide, or with a liquid precursor of a polymer electrolyte followed by polymerization. The electrical contacts to the electrodes are produced on one side by a tantalum or niobium wire which is sintered in during production of the substrate structure and on the other side by the metallic capacitor sheath, which is insulated with respect to the wire.

The capacitance C of a capacitor is calculated using the following formula:

$$C = (F \cdot \in)/(d \cdot V_F)$$

where F denotes the capacitor surface area, $\in$ the dielectric constant, d the thickness of the insulator layer per V of forming voltage and $V_F$ the forming voltage. Since the dielectric constant $\in$ is 27.6 or 41 for tantalum pentoxide or niobium pentoxide, respectively, but the growth in the layer thickness per volt of forming voltage d is 16.6 or 25 Å/V, both pentoxides have the same quotient $\in/d = 1.64$ or 1.69, respectively. Capacitors based on both pentoxides, with the same geometry of the anode structures, therefore have the same capacitance. Trivial differences in details concerning specific weight-related capacitances result from the different densities of Nb, $NbO_x$ and Ta. Anode structures made from Nb and $NbO_x$ therefore have the advantage of saving weight when used, for example, in mobile telephones, in which every gram of weight saving is a priority. With regard to cost aspects, $NbO_x$ is more favourable than Nb, since some of the volume of the anode structure is provided by oxygen.

EP 1 388 870 A1 has already disclosed capacitors which include an electrode produced by sintering a niobium suboxide powder of formula $NbO_x$ (x=0.8 to 1.2). The niobium suboxide powder described in EP 1 388 870 A1 is distinguished in particular by a tap density of 0.5 to 2.5 g/ml, and the sintered body produced therefrom is distinguished by a specific porosity. The niobium suboxide powder may contain a large number of other elements, e.g. Mg, Ca, Sr, Ba, Sc, Y, La, Ce, Pr, Ti, Zr, Hf, V, Ta, Mo, W, Mn, Re, Ru, Os, Rh, Ir, Pd, Al, C, Si and numerous others; these elements may be added in a quantity of from 50 to 200,000 ppm, i.e. up to 20% by weight. EP 1388 870 A1 does not disclose whether the presence of certain elements belonging to the abovementioned group has particular advantages and in what quantity specific elements should be present.

One significant quality feature of capacitors is the leakage current, i.e. the residual current permeability of the pentoxide barrier layer, which should be as low as possible in order to avoid losses. Impurities such as Fe, Cr, Li, alkali metals, halogens, carbon and others have particularly adverse effects on the residual current. These impurities, in capacitors based on niobium suboxide, may evidently still have an adverse effect with regard to the residual current even in extremely low concentrations. When niobium suboxide is being produced by means of the standard metallurgical process, in which highly oxidized niobium ($Nb_2O_5$) is treated with metallic niobium at elevated temperature in a nonoxidizing, preferably reducing atmosphere so as to balance out the oxygen concentration, the metallic impurities of smaller atomic radius evidently accumulate at the particle surface layer during the diffusion of the oxygen into the originally metallic particles, since they are faster at performing the required site exchange reaction than the niobium atoms. After forming of the anode structure, they are then available as imperfections in particular in the barrier layer. The migration of impurities to the surface moreover is not symmetrical, but rather is uneven, for example depending on whether the random adjacent particle happens to be an oxygen-donating or an oxygen-receiving particle in the oxygen exchange. This causes fluctuations in the impurity concentrations, which are associated with increased peak residual current values.

SUMMARY OF THE INVENTION

It is an object of the present invention to reduce the residual current in capacitors based on niobium suboxide anodes.

A further object of the invention is to reduce fluctuations in residual current caused by the production of capacitors within a batch.

A further object of the invention is to provide a niobium suboxide powder which is advantageous in terms of primary and secondary structure for the capacitor production.

It has been discovered that by doping niobium suboxide with magnesium, tungsten and/or molybdenum, it is possible to have a favourable effect on the residual current of capacitors produced therefrom with regard to the abovementioned properties. The doping elements incorporated in the lattice evidently form traps for disruptive impurities, i.e. in the vicinity of the doping elements, which form imperfections in the lattice structure of the niobium oxide, the impurities may be bonded in such a manner that they are neutralized in terms of their influence on the residual current, for example, in accordance with the hypothesis formulated above, do not accumulate at the particle surface.

DETAILED DESCRIPTION OF THE INVENTION

Figure 1A:
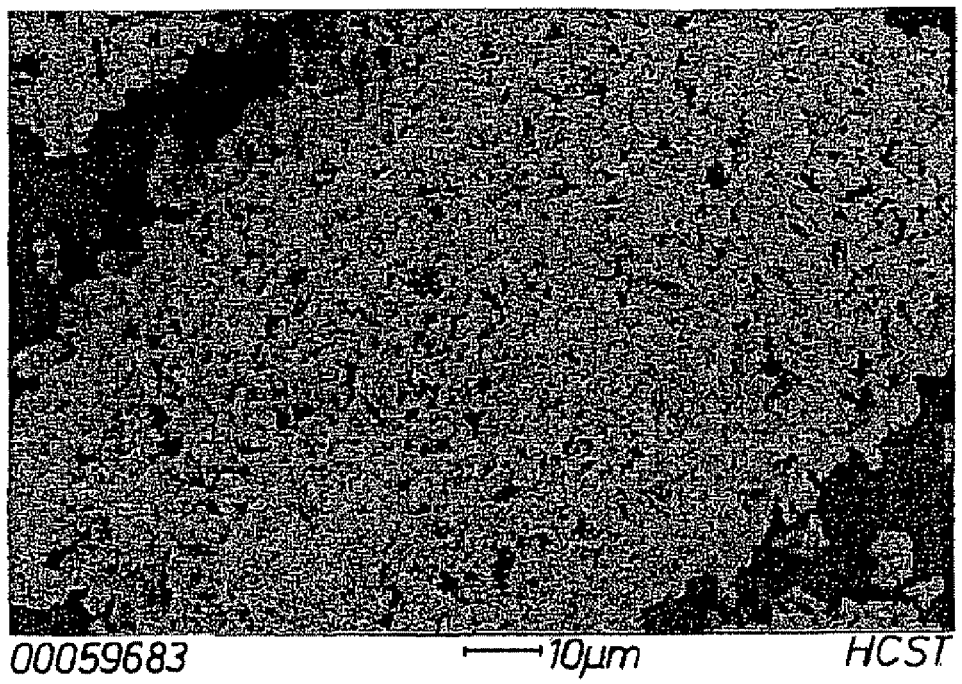
FIG. 1a and FIG. 1b are pictorial representations of a scanning electron micrograph (SEM) image of a preferred powder according the present invention, which includes agglomerated spherical primary particles.

The invention relates to niobium suboxide powders containing 100 to 600 ppm of magnesium and/or 50 to 400 ppm of molybdenum and/or tungsten. Niobium suboxide powders which contain both 100 to 600 ppm of magnesium and 50 to 400 ppm of molybdenum and/or tungsten are preferred.

The magnesium content is particularly preferably between 150 and 400 ppm, and the molybdenum and/or tungsten content is particularly preferably between 60 and 250 ppm. Molybdenum is preferred over tungsten, in particular in combination with magnesium.

Suitable niobium suboxides are those of formula $NbO_x$, where x is between 0.7 and 1.3, corresponding to an oxygen content of between 10.8 and 18.3% by weight; it is preferable for x to be between 1 and 1.033, corresponding to an oxygen content of from 14.7 to 15.1% by weight. An oxygen content which is slightly above the stoichiometric composition of x=1 is particularly preferred.

The levels of further impurities, with the exception of standard dopants, such as nitrogen and phosphorus, should be as low as possible. Levels or alloying constituents of tantalum are harmless, provided that they replace niobium in accordance with the formula $(Nb, Ta)O_x$. Particularly preferred niobium suboxide powders have levels of Fe, Cr, Ni, Cu, alkali metals and fluoride and chloride of in each case less than 15 ppm. Furthermore, it is preferable for the sum of these levels to be less than 35 ppm. The carbon content of the niobium suboxide powders according to the invention should preferably be less than 40 ppm.

A nitrogen content of from 10 to 500 ppm is advantageous.

Phosphorus contents in the niobium suboxide powders according to the invention are not generally harmful. In niobium and tantalum metal powders, phosphorus is used to lower the sintering activity during production of the secondary structures and of the anode structure. In most cases, however, it is generally undesirable to lower the sintering activity with powders according to the invention. Phosphorus contents of less than 10 ppm are preferred according to the invention. The powders may if appropriate be treated with phosphoric acid, ammonium hydrogen phosphate or ammonium phosphate prior to the sintering of the anode structure.

Further, albeit less critical impurities, comprising Al, B, Ca, Mn and Ti, preferably form less than 10 ppm, and there is also preferably less than 20 ppm of Si.

The niobium suboxide powders according to the invention preferably comprise agglomerated primary particles with a mean cross-sectional dimension of from 0.3 to 1.5 µm, particularly preferably between 0.4 and 1 µm. The primary particles may be in the form of beads, platelets, filaments or in other forms. It is important for the smallest cross-sectional dimension (if the shape is other than spherical) to be in the range between 0.3 and 1.5 µm.

The primary particle agglomerates preferably have a particle size distribution determined in accordance with ASTM B 822 ("Mastersizer"; wetting agent Daxad 11) which is defined by a D10 value of 50 to 100 µm, a D50 value of from 150 to 200 µm and a D90 value of from 250 to 350 µm. The sponge-like agglomerates have a round to oval cross section and good flow properties (in accordance with Hall, ASTM B 213) of less than 60 sec/25 g. The bulk density (in accordance with Scott, ASTM B 329) is between 0.9 and 1.2 g/cm³ (14.8 to 19.7 g/inch³). The specific surface area (BET, ASTM D 3663) is between 0.85 and 2.5 m²/g, particularly preferably between 1 and 1.5 m²/g.

Figure 1B:
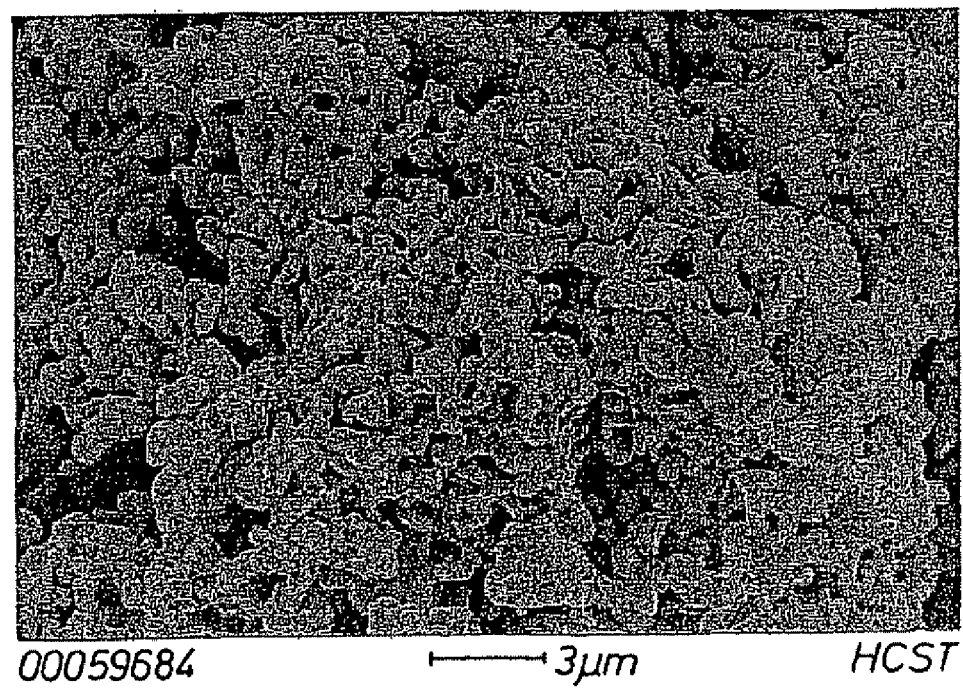

FIG. 1 shows an SEM image of a preferred powder of this type which comprises agglomerated spherical primary particles.

The excellent pressing and sintering properties of the preferred niobium suboxide powders also results from the stability of the sintered bridges, which can be established by means of the temperature during a agglomeration. One measure of this is the change in the particle size distribution after the agglomerates have been treated in an ultrasound bath. After the preferred agglomerates have been treated for 15 minutes in an ultrasound bath, a bimodal particle size distribution with pronounced frequency maxima between 2 and 10 µm (secondary maximum), on the one hand, and between 90 and 200 µm (primary maximum), on the other hand, is established. The D10 value (Mastersizer, ASTM B 822) is between 1.5 and 3.0 µm, the D50 value is between 20 and 60 µm and the D90 value is between 70 and 130 µm.

The powders which are preferred in accordance with the invention have a porosity, determined by mercury intrusion, of from 50 to 65% by volume, particularly preferably 53 to 60% by volume. More than 90% of the pore volume is formed by pores with a diameter of between 0.2 and 3 µm. The broad pore volume distribution curve plotted against the pore diameter has steep flanks with a minimum in the region of twice the primary particle diameter.

Figure 2:
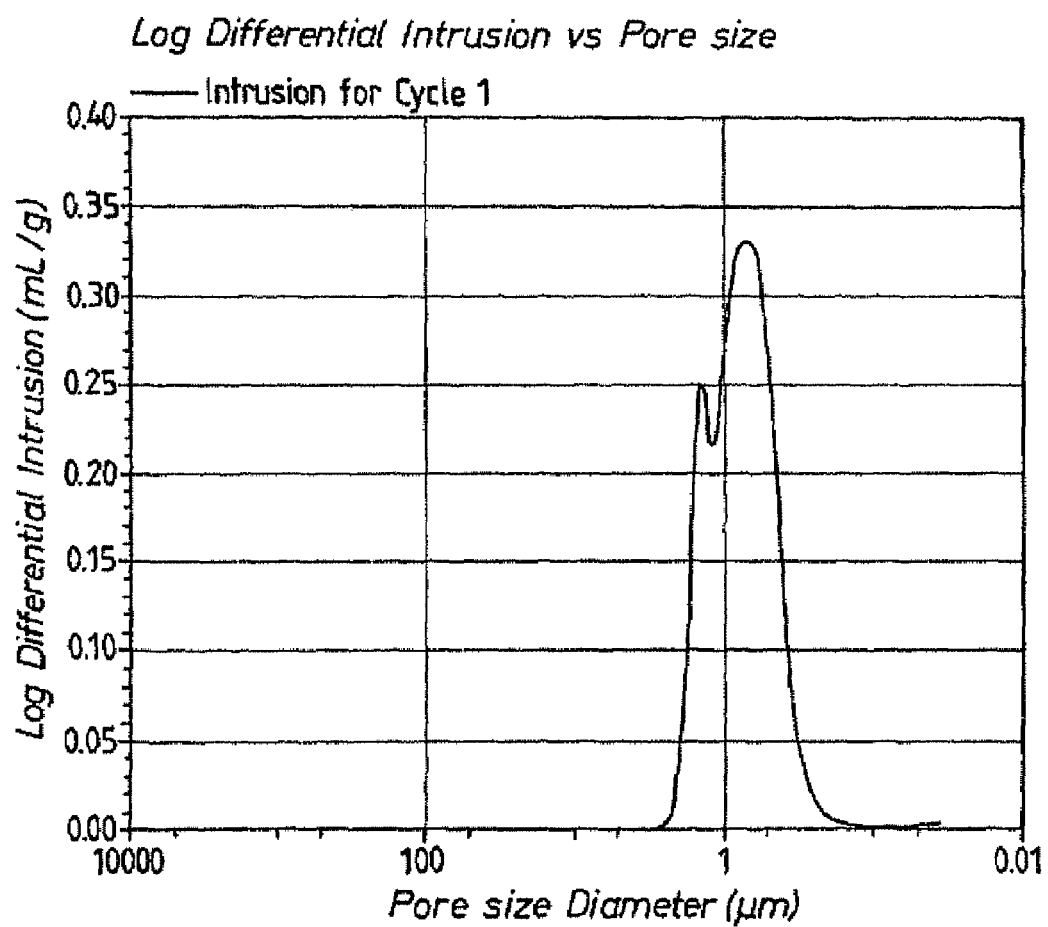
FIG. 2 is a graphical representation of a pore size distribution curve for the powder of FIG. 1, in which the Log of Differential Intrusion is plotted against Pore Size Diameter.

FIG. 2 shows a pore size distribution curve of this type for the powder shown in FIG. 1, with a deficit of pores in the range from 1.1 to 1.2 µm.

The niobium suboxide powders which are preferred in accordance with the invention allow capacitors with a residual current of less than 0.2 nA/µFV to be produced using the standard method. Residual currents of as low as 0.03 nA/µFV are achieved.

Accordingly, the invention also relates to capacitors with a niobium suboxide anode and a niobium pentoxide barrier layer which have a residual current of less than 0.2 nA/µFV, the niobium suboxide being doped with magnesium, molybdenum and/or tungsten. Preferred features of the capacitors according to the invention correspond to the preferred features of the niobium suboxide powders described above.

Capacitors according to the invention have specific capacitances of 50,000 to 200,000 µFV/g, preferably 70,000 to 150,000 µFV/g.

The capacitors can be produced as follows:

The powder is pressed to a pressed density of 2.3 to 3.5 g/cm³ around a niobium or tantalum wire inserted into the press mould, to form powder preforms. Pressed bodies with a very favourable pressed strength are obtained. By way of example, the standardized measurement carried out on cylindrical pressed bodies (without wire) with a diameter of 5.2 mm and a height of 5.1 mm using a weighed-in quantity of 301 mg of niobium suboxide powder, after pressing to a density of 2.8 g/cm³, is stable under an applied weight of from 0.5 to 1 kg.

The pressed bodies containing the contact wire are then preferably sintered in a niobium or tantalum boat at 1100 to 1500° C. for a sintering holding time of from 15 to 25 minutes, preferably approx. 20 minutes, under a high vacuum at $10^{-8}$ bar. The sintering temperature is selected in such a way that the capacitor surface area, which can subsequently be calculated from the capacitance, is still 65 to 45% of the specific surface area measured for the powder. The optimum sintering temperature and sintering holding time can be determined by sintering the pressed body described above for the determination of the pressed strength. The sintering temperature and time are preferably selected in such a way that this pressed body is able to withstand an applied load of from 8 to 18 kg.

In the context of the present disclosure, the residual current and capacitance were determined in the following way:

The sintered anode structures were formed in an aqueous electrolyte comprising 0.1% by weight strength $H_3PO_4$ at 85° C. and a forming current of 150 mA/g up to a forming voltage of 30 V and over a final forming time (virtually current-free) over 120 minutes.

The capacitance and residual current were measured by immersing the capacitors in an aqueous electrolyte comprising 18% strength by weight $H_2SO_4$ at a temperature of 25° C. and an AC voltage of 70% of the forming voltage (21 V) and 120 Hz, with a superimposed bias voltage of 10 V, after a charging time of 3 minutes.

The powders according to the invention can be produced using standard processes. The standard metallurgical reaction and alloying process, according to which, as in the present case, a mean oxide content is set by exposing a highly oxidized precursor and a nonoxidized precursor, in a nonoxidizing, preferably reducing atmosphere, to a temperature at which an oxygen concentration balancing takes place, is preferred. Processes other than this solid-state diffusion process are conceivable, but they require control and monitoring functions which are in technical terms almost intractable at acceptable outlay. Therefore, according to the invention it is preferable to use a high-purity, commercially available niobium pentoxide and for the latter to be mixed stoichiometrically with high-purity niobium metal, both in powder form, followed by treatment at a temperature of from 800 to 1600° C. in an $H_2$ atmosphere for several hours. It is preferable for both the pentoxide and the metal to have primary particle sizes which, after the oxygen balancing, correspond to the desired primary particle size of below or slightly above 1 μm (minimum) cross-sectional dimension.

According to the invention, it is preferable for the doping with magnesium, molybdenum and/or tungsten to be carried out at the latest before or during, particularly preferably before, the oxygen exchange between the oxide component and the metal component.

To avoid contamination, it is preferable for all the reactors and vessels, such as crucibles, boats, grates, meshes, etc. which come into contact with niobium or niobium oxides at elevated temperature to be made from or lined with preferably niobium or tantalum.

The niobium metal required for the oxygen exchange with niobium pentoxide is preferably produced by reduction of high-purity niobium pentoxide to form the metal. This can be effected aluminothermically by igniting an $Nb_2O_5/Al$ mixture and washing out the aluminium oxide which is formed and then purifying the niobium metal ingot by means of electron beams. The niobium metal ingot obtained after reduction and electron beam melting can be embrittled using hydrogen in a known way and milled, producing plateletlike powders. In this case, the doping is advantageously performed by adding the doping metals to the melt.

The preferred process for producing the niobium metal follows the disclosure of WO 00/67936 A1. According to this preferred two-stage process, the high-purity niobium pentoxide powder is firstly reduced by means of hydrogen at 1000 to 1600° C., preferably up to 1400° C., to form the niobium dioxide of approximately formula $NbO_2$, and is then reduced to the metal using magnesium vapour at 900 to 1100° C. Magnesium oxide which is formed in the process is washed out by means of acids. For magnesium doping which is sufficient in accordance with the invention, it is generally sufficient to leave out the final acid wash from the teaching of WO 00/67936 A1. However, it is preferable to add preferably MgO to the metal component and/or oxide component prior to the oxygen exchange reaction. For the molybdenum and/or tungsten doping, it is advantageously possible to carry out an impregnation in molybdic and/or tungstic acid solution prior to the reduction of the pentoxide to form the metal. The person skilled in the art will be readily familiar with further doping options. By way of example, $MoO_3$ and/or $WO_3$ powders may be added to the niobium pentoxide powder or niobium dioxide powder. The doping both with Mg and with Mo/W, or the preferred mixed doping with both Mg and Mo and/or W, with Mo being preferred over W, particularly preferably takes place as early as during production of the niobium pentoxide, for example through addition of the corresponding dopants, preferably the oxides, to the $Nb(OH)_5$, which is converted into niobium pentoxide by heating in a manner which is known per se.

EXAMPLES 1 to 9

The starting material is a niobium pentoxide powder produced by calcining a niobium hydroxide which has been obtained by precipitation from an $H_2NbF_7$ solution by means of aqueous ammonia solution. The chemical analysis was as follows:

| Al | <1 ppm | As | <1 ppm |
|----|--------|-----|--------|
| Ca | <1 ppm | Cl | <3 ppm |
| Co | <0.1 ppm | Cr | <0.3 ppm |
| Cu | 0.4 ppm | F | 51 ppm |
| Fe | <1 ppm | K | <0.5 ppm |
| Mg | <1 ppm | Mo | <0.3 ppm |
| Na | 2 ppm | Ni | <0.2 ppm |
| Si | 8 ppm | Ta | <10 ppm |
| Ti | <1 ppm | V | <1 ppm |
| W | <0.5 ppm | Zr | <0.5 ppm. |

Where the "<" sign is used for the analysis values, the concentration indication in each case characterizes the detection limit of the analysis method, or the content can be characterized as below the detection limit on the basis of the analysis accuracy.

The powder agglomerates comprised very uniform sintered, spherical primary particles with a mean diameter of 0.6 μm.

The BET specific surface area was 2.4 $m^2/g$. 97.5% by weight of the agglomerates were smaller than 300 μm (sieve analysis).

In each case one quantity of the powder was doped with the quantity (ppm) of Mg, Mo and/or W given in Table 1 below by the addition of MgO powder, $MoO_3$ powder and/or $WO_3$ powder followed by further calcining in air.

TABLE 1

| Example | Mg ppm | Mo ppm | W ppm |
|---------|--------|--------|-------|
| 1 (Comp.) | — | — | — |
| 2 | 250 | — | — |

TABLE 1-continued

| Example | Mg ppm | Mo ppm | W ppm |
|---|---|---|---|
| 3 | — | 200 | — |
| 4 | — | — | 220 |
| 5 | 200 | 150 | — |
| 6 | 180 | 170 | — |
| 7 | 170 | 60 | 60 |
| 8 | 100 | 30 | — |
| 9 | 200 | 50 | — |

A part of each of the powders 1 to 9 was firstly reduced by calcining at 1380° C. under hydrogen to form the $NbO_2$. The $NbO_2$ was then placed onto a mesh of niobium wire, beneath which, in a vessel made from niobium metal, was approximately 1.4 times the stoichiometric quantity of magnesium chips, based on the oxygen content of the $NbO_2$. This was followed by heating to 970° C. under an argon atmosphere at a pressure of approximately 1050 mbar. After 6 hours, the temperature was in each case slowly cooled with gradual introduction of air for passivation purposes.

After sieving through a sieve with a mesh width of 300 μm, the powder was repeatedly leached with 8% strength by weight sulphuric acid, washed and dried in order to remove the MgO formed.

The surface of the metal powder was greatly roughened. Depending on the batch, the specific surface area was from 4.5 to 5 $m^2/g$, with only a slightly smaller primary structure dimension of from 0.45 to 0.55 μm.

Each of the metal powders was mixed in a molar ratio of 3:1 with the starting niobium pentoxide in a quantity which was such that the mean composition of the mixture formally corresponded to the formula NbO. The mixtures were each heated slowly to 1400° C. for four hours in a hydrogen atmosphere at 1050 mbar, cooled slowly and passivated.

The NbO obtained had the contents of doping elements shown in Table 2.

The primary particle diameter determined under a scanning electron microscope was 0.5 to 0.65 μm. The D10 value was 50 to 70 μm, the D50 value was 170 to 190 μm and the D90 value was 270 to 295 μm. The specific surface area was between 1 and 1.15 $m^2/g$.

TABLE 2

| Example | Mg ppm | Mo ppm | W ppm |
|---|---|---|---|
| 1 (Comp.) | 80 | — | — |
| 2 | 350 | — | — |
| 3 | 84 | 262 | — |
| 4 | 82 | — | 289 |
| 5 | 303 | 187 | — |
| 6 | 310 | 205 | — |
| 7 | 294 | 74 | 69 |
| 8 | 178 | 53 | — |
| 9 | 366 | 81 | — |

The further impurities were substantially unchanged. The levels of harmful impurities were as follows:

| C | 24 ppm | Cl | <1 ppm |
|---|---|---|---|
| Cr | 2 ppm | Cu | 0.4 ppm |
| F | 2 ppm | Fe | 6 ppm |
| K | <1 ppm | Na | 2 ppm |
| Ni | 2 ppm | | |

Anodes with a diameter of 3.6 mm and a length of likewise 3.6 mm were pressed from the powders around a tantalum wire placed into the press mould, with a thickness of 0.3 mm, at a pressed density of 2.8 $g/cm^3$, followed by sintering under a high vacuum at 1460° C. for 20 minutes.

The anodes were formed in an electrolyte comprising 0.1% strength by weight phosphoric acid at a temperature of 85° C. and a forming current of 150 mA/g up to a forming voltage of 30 V, which was held for two hours after the current had decayed.

The capacitance and residual current of the anode bodies provided with a barrier layer of niobium pentoxide by the forming were measured by the counterelectrode being simulated by an 18% strength by weight sulphuric acid at 25° C. The measurements were carried out at a voltage of 21 V (70% of the forming voltage), a frequency of 120 Hz and a bias voltage of 10 V after a charging time of 3 minutes. The measurement results are compiled in Table 3.

TABLE 3

| Example | Spec. capacitance μFV/g | Spec. residual current nA/μFV |
|---|---|---|
| 1 (Comp.) | 70846 | 2.3 |
| 2 | 72483 | 0.08 |
| 3 | 71925 | 0.12 |
| 4 | 68569 | 0.14 |
| 5 | 71896 | 0.03 |
| 6 | 72371 | 0.02 |
| 7 | 70478 | 0.05 |
| 8 | 77746 | 0.11 |
| 9 | 79112 | 0.04 |

What is claimed is:

1. A niobium suboxide powder comprising 100 to 600 ppm of magnesium.

2. The niobium suboxide powder of claim 1 having a magnesium content of 150 to 400 ppm.

3. The niobium suboxide powder of claim 1, comprising a member selected from the group consisting of Fe, Cr, Ni, Cu, alkali metals, fluoride, chloride and combinations thereof, wherein each member is independently present in an amount of less than 15 ppm.

4. The niobium suboxide powder according to claim 3 wherein said member selected from the group consisting of Fe, Cr, Ni, Cu, alkali metals, fluoride, chloride and combinations thereof, is present in an amount totalling less than 35 ppm.

5. The niobium suboxide powder of claim 1, comprising agglomerated primary particles having a diameter of from 0.3 to 1.5 μm.

6. The niobium suboxide powder of claim 1 having a carbon content of less than 40 ppm.

7. The niobium suboxide powder of claim 1 having a nitrogen content of 10 to 500 ppm.

8. A niobium suboxide anode comprising a sintered powder of the niobium suboxide powder of claim 1.

9. A solid electrolyte capacitor comprising the niobium suboxide anode of claim 8, and a barrier layer comprising niobium pentoxide.

* * * * *